May 8, 1923.
W. T. HARRELL
ELECTRIC WATER STERILIZER AND PURIFIER
Filed Aug. 8, 1922
1,454,736
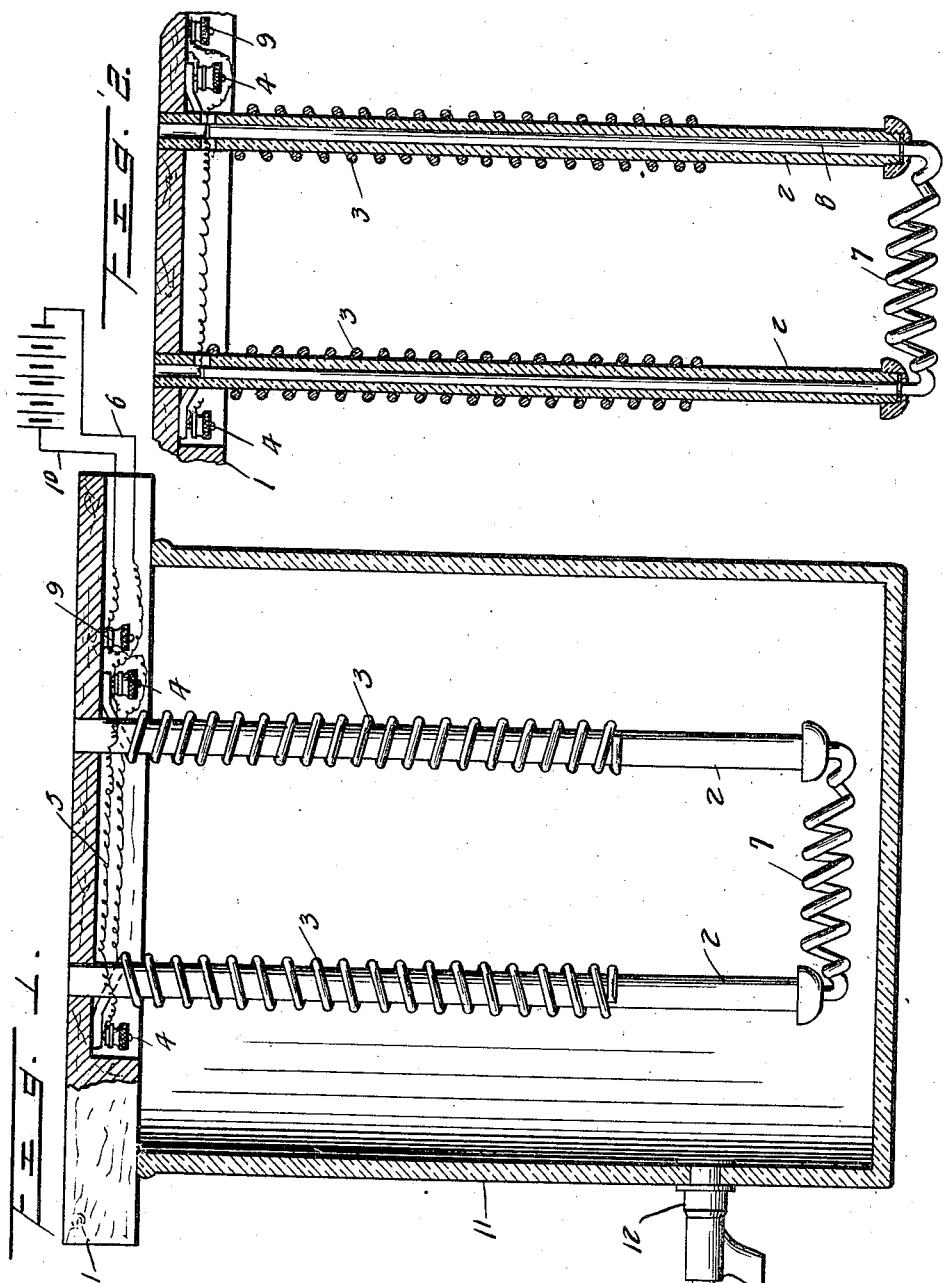
Inventor
W. T. Harrell,
By
Attorney Patented May 8, 1923.

1,454,736

UNITED STATES PATENT OFFICE.

WILLIAM T. HARRELL, OF WICHITA, KANSAS.

ELECTRIC WATER STERILIZER AND PURIFIER.

Application filed August 8, 1922. Serial No. 580,417.

*To all whom it may concern:*

Be it known that I, WILLIAM T. HARRELL, a citizen of the United States, residing at Wichita, in the county of Sedgwick and State of Kansas, have invented certain new and useful Improvements in Electric Water Sterilizers and Purifiers; and I do hereby declare the following to be a full, clear, and exact description of the invention, such as will enable others skilled in the art to which it appertains to make and use the same.

The invention has relation to means for sterilizing and purifying drinking water, by the utilization of electricity as the active agent.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is an elevation of a water sterilizer and purifier embodying the invention, showing the same in operative position, the water container being in section and a portion of the head or support being broken away, and Figure 2 is a view similar to Figure 1, the water container being omitted and partly in section.

Corresponding and like parts are referred to in the following description and designated in both views of the drawings by like reference characters.

The device comprises a head or support 1 which may be of any suitable material, such as wood. Rods 2 of suitable insulating material, such as porcelain, hard rubber or the like, are attached at their upper ends to the head 1. Electrodes 3 are mounted upon the rods 2 and are electrically connected at their upper ends and to one pole of a generator or battery B. The electrodes 3 preferably consist of wire coils which are shown connected at their upper ends to binding posts 4, which are electrically connected by means of a conductor 5 and to one pole of the battery B by means of a wire 6. The electrodes 3 terminate at their lower ends some distance from the lower ends of the rods 2.

An electrode 7 is supported between the lower ends of the rods 2 and a conductor 8 passing through one of the rods 2 is connected to a binding post 9, and a wire 10 connects the binding post 9 with the opposite pole of the battery B.

In practice it is to be understood that the electrodes 3 may be electrically connected in any preferred way and that an electric cord may extend from the electrodes 3 and 7 and be supplied with a plug to make connection with a service outlet in substantially the same manner as electric fans, irons and other articles are plugged into or coupled to the outlet of a service line.

In practice, the water to be sterilized and purified, is placed in a container 11 and the device is suspended therein by means of the head 1 which rests upon the top of the container. The electric cord leading from the device is plugged into the outlet of a service line and as soon as the circuit is established, the water is acted upon and its constituents, hydrogen and oxygen, are liberated and escape in the form of bubbles and the impurities are separated and rendered insoluble and precipitate to the bottom of the container. This operation is continued usually for a period of about thirty minutes to sterilize and purify about five gallons of water. The container 11 is provided with a faucet 12 a short distance from its bottom, whereby to draw off the pure water without disturbing the precipitate.

What is claimed is:

A water sterilizer and purifier, comprising a head, rods of insulating material secured at one end to said head, wire coils mounted upon the rods and constituting electrodes which are electrically connected at their upper ends, a wire coil supported between the lower ends of the rods, and a conductor passing through one of the rods and electrically connected with the electrodes at the ends thereof.

In testimony whereof I affix my signature in presence of two witnesses.

WILLIAM T. HARRELL.

Witnesses:
J. P. RANDOLPH,
CHAS. P. ENBRY.